United States Patent
Chaudhry et al.

(10) Patent No.: US 6,646,839 B2
(45) Date of Patent: Nov. 11, 2003

(54) SURGE SUPPRESSOR

(75) Inventors: Nisar A. Chaudhry, Huntington Station, NY (US); Alfred J. Roach, Lindenhurst, NY (US)

(73) Assignee: TII Industries, Inc., Copiague, NY (US)

( * ) Notice: Subject to any disclaimer, the term of this patent is extended or adjusted under 35 U.S.C. 154(b) by 161 days.

(21) Appl. No.: 10/045,509

(22) Filed: Nov. 7, 2001

(65) Prior Publication Data

US 2003/0086225 A1 May 8, 2003

(51) Int. Cl.⁷ ................................................. H02H 3/20
(52) U.S. Cl. ............................ 361/44; 361/42; 361/45
(58) Field of Search ............................... 361/42, 44, 45

(56) References Cited

U.S. PATENT DOCUMENTS

| | | | |
|---|---|---|---|
| 4,023,071 A | * 5/1977 | Fussell | 361/56 |
| 4,168,514 A | 9/1979 | Howell | 361/56 |
| 4,587,588 A | * 5/1986 | Goldstein | 361/54 |
| 4,903,161 A | * 2/1990 | Huber et al. | 361/56 |
| 5,572,396 A | 11/1996 | Robinson | 361/93 |
| 5,600,524 A | 2/1997 | Neiger et al. | 361/42 |
| 5,654,857 A | 8/1997 | Gershen | 361/42 |
| 5,825,599 A | 10/1998 | Rosenbaum | 361/45 |
| 5,841,615 A | 11/1998 | Gershen | 361/42 |
| 5,943,199 A | 8/1999 | Aromin | 361/42 |
| 6,060,876 A | * 5/2000 | Glasband et al. | 323/355 |
| 6,118,639 A | 9/2000 | Goldstein | 361/55 |
| 6,122,155 A | 9/2000 | Aromin et al. | 361/42 |
| 6,212,048 B1 | 4/2001 | Chaudhry | 361/42 |

* cited by examiner

Primary Examiner—Bao Q. Vu
(74) Attorney, Agent, or Firm—Morgan & Finnegan, L.L.P.

(57) ABSTRACT

An improved surge suppressor which combines a ground fault circuit interrupter with overvoltage protection for AC power lines. The surge suppressor includes a switchable device for disconnecting power from the ground fault circuit interrupter in the event the AC neutral is lost.

12 Claims, 5 Drawing Sheets

SURGE SUPPRESSOR

BACKGROUND OF THE INVENTION

1. Field of the Invention

The present invention relates to an improved surge suppressor which combines a ground fault circuit interrupter with overvoltage protection for AC power lines. The surge suppressor includes a switchable device for disconnecting power from the ground fault circuit interrupter in the event the AC neutral is lost.

2. Discussion Of The Related Art

Apparatus which combine a ground fault circuit interrupter ("GFCI") with AC overvoltage protection are known. One such apparatus is shown in U.S. Pat. No. 5,654,857 and U.S. Pat. No. 5,841,615, both issued to Bernard Gershen. These patents disclose a GFCI in combination with MOVs connected between the AC line and the AC neutral, between the AC line and ground and between the AC neutral and ground. Another such apparatus is shown in U.S. Pat. No. 6,212,048 B1 issued to Nisar A. Chaudhry, which discloses a GFCI in combination with overvoltage protection between the AC line and the AC neutral and which provides overvoltage protection for electrical equipment without using a separate ground conductor. Instead, a "virtual ground" circuit is employed which simulates the ground conductor. None of the apparatus disclosed in these patents deals with the loss of the AC neutral, which can occur if the neutral bar at the service entrance corrodes, something which occurs not infrequently in salt air environments.

SUMMARY OF THE INVENTION

The present invention combines a GFCI with AC overvoltage protection and also uses a switchable device to disconnect the power from the GFCI in the event the AC neutral is lost. The preferred embodiments employ a relay with the coil connected between the AC line and the AC neutral. The AC line and the AC neutral are connected to a set of input relay contacts. The GFCI is connected to the AC line and the AC neutral through a set of output relay contacts. Under normal operating conditions the relay is energized and power flows through the relay to the GFCI via the relay contacts. If the AC neutral is lost, the relay is deenergized and the contacts open, thereby disconnecting power from the GFCI. The GFCI preferably has one or more AC outlets for receiving three-prong AC plugs.

The subject matter which I regard as my invention is more particularly pointed out in the claims at the end of the specification. The invention, including its method of operation and its numerous advantages, may best be understood by reference to the following description taken in conjunction with the accompanying drawings wherein like numerals refer to like components.

DETAILED DESCRIPTION

Figure 1:
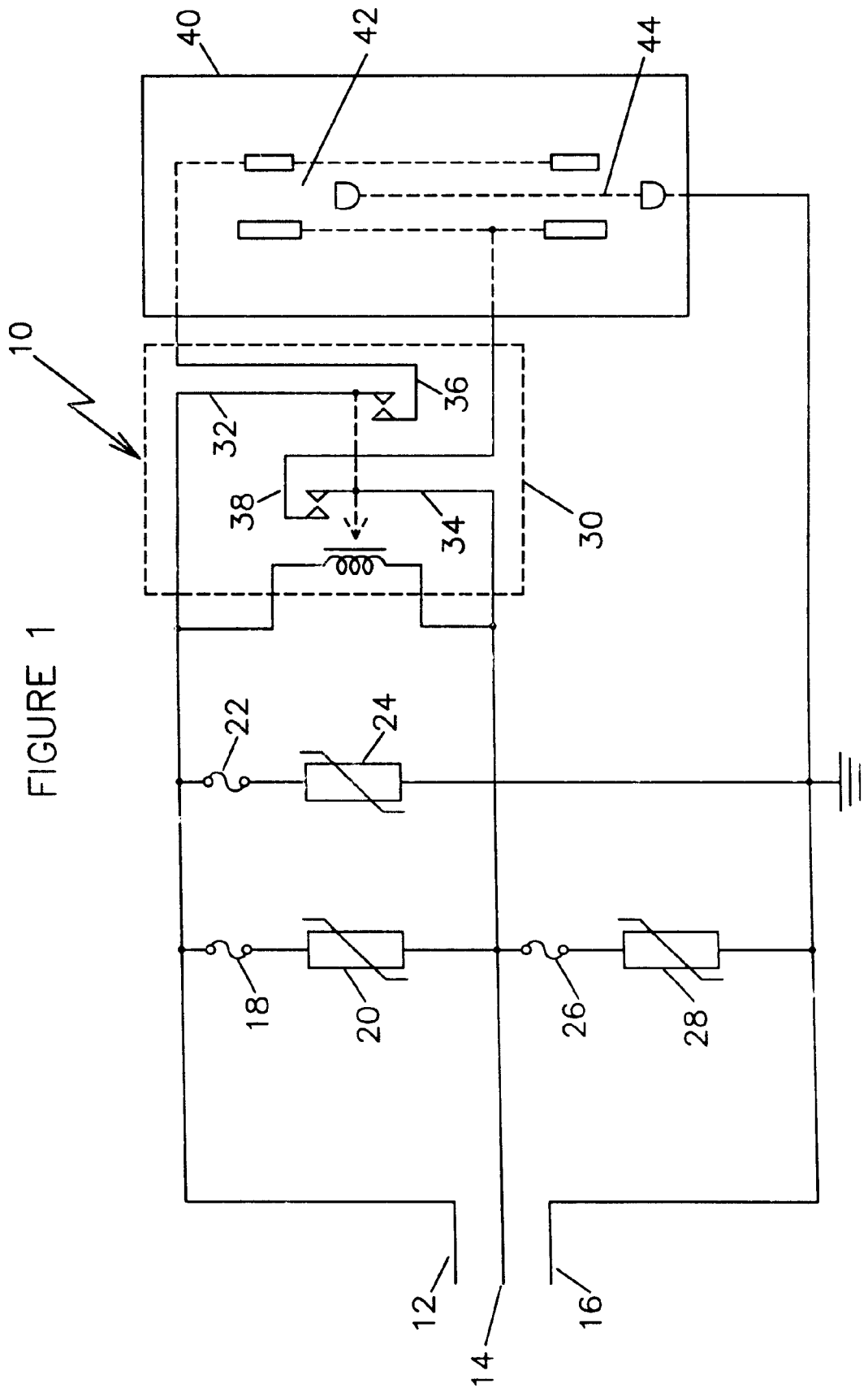
FIG. 1 is a schematic diagram of a first embodiment of the invention.

FIG. 1 is a schematic diagram of a first embodiment of the invention. The surge suppressor 10 has conductors 12, 14 and 16 adapted to be connected, respectively, to the AC line, the AC neutral and ground. The surge suppressor preferably has overvoltage protection connected between the AC line and the AC neutral, between the AC line and ground and between the AC neutral and ground. The overvoltage protection between the AC line and the AC neutral comprises thermal sensing fuse 18 and MOV 20. The overvoltage protection between the AC line and ground comprises thermal sensing fuse 22 and MOV 24. The overvoltage protection between the AC neutral and ground comprises thermal sensing fuse 26 and MOV 28. Thermal sensing fuses 18, 22 and 26 may all be G4A01084C made by Thermodisc Incorporated, 1320 South Main Street, Mansfield, Ohio. MOVs 20, 24 and 28 may all have a breakdown voltage of 130 volts.

Connected to the AC line and the AC neutral is a switchable device in the form of a single pole, double throw relay 30. The coil of relay 30 is connected between the AC line and the AC neutral so that, when the surge suppressor is connected to a source of AC power, the relay is energized. Contacts 32 and 34 of relay 30 are also connected to the AC line and the AC neutral, respectively. Connected to contacts 36 and 38 of relay 30 is a GFCI device 40 which has two receptacles 42, 44 for receiving three-prong AC plugs. GFCI 40 is also connected to ground. Under normal operating conditions, AC power is provided to GFCI 40 through contacts 32, 36 and 34, 38 of relay 30. If the AC neutral is lost, however, relay 30 becomes deenergized and contacts 32, 36 and 34, 38 open, thereby removing power from GFCI 40. Relay 30 may be K10P-11A15-120 made by Tyco Electronics, Menlo Park, Calif. GFCI 40 may be a GF15B-K made by Eagle Electric Manufacturing Co., Long Island City, N.Y. While surge suppressor 10 in FIG. 1 uses a switchable device in the form of an electromechanical relay to sense the loss of the AC neutral and disconnect power from the GFCI, other equivalent apparatus may also be employed. For example, a solid state switchable device may be used and would be equally effective.

Figure 2:
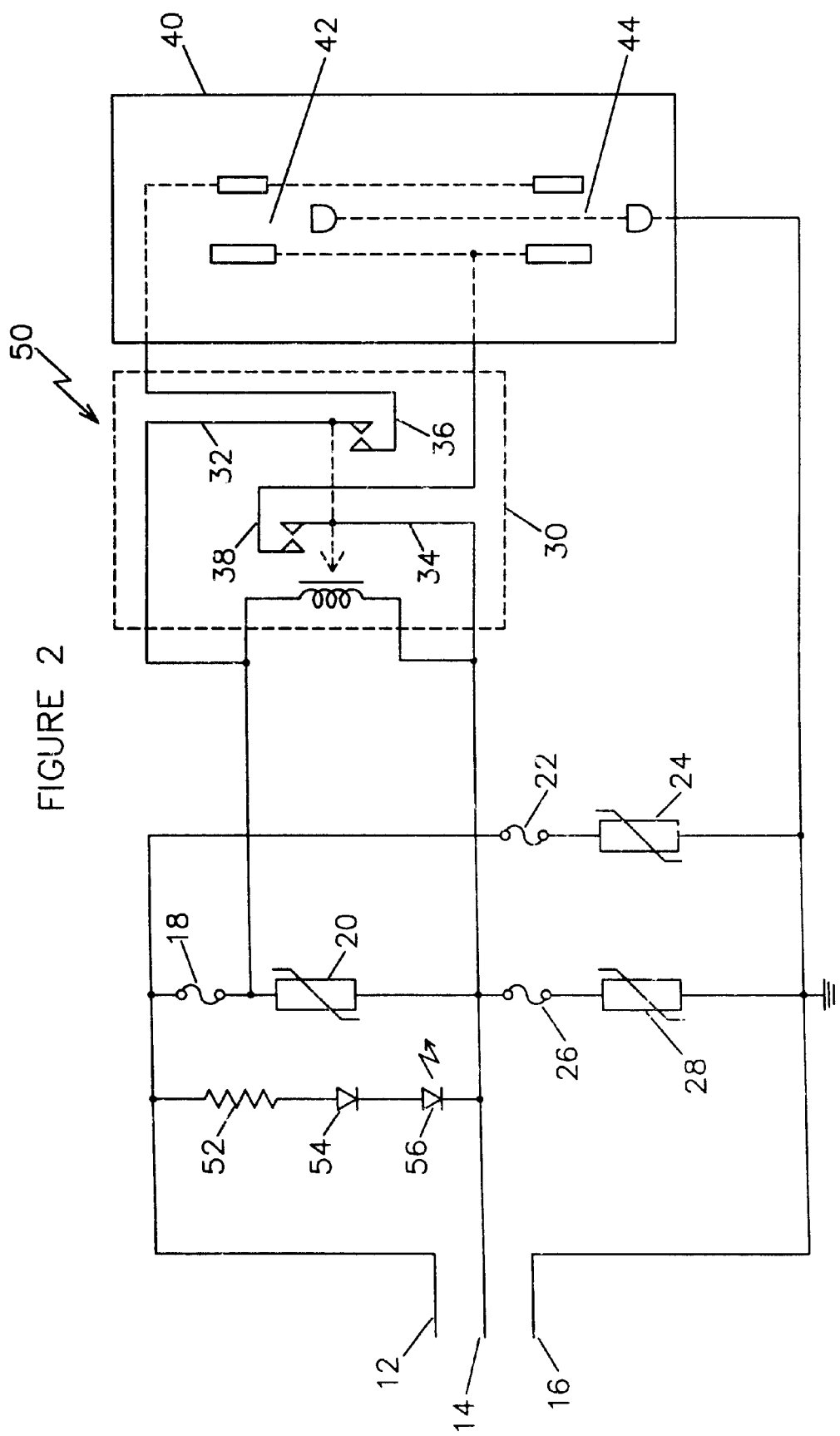
FIG. 2 is a schematic diagram of a second embodiment of the invention.

FIG. 2 is a schematic diagram of a second embodiment of the invention. Surge suppressor 50 comprises resistor 52, diode 54 and light emitting diode (LED) 56 which provides a visual indication of normal operation. When the surge suppressor 50 is connected to a source of AC power LED 56 will be lighted if both the AC line and the AC neutral are present.

Figure 3:
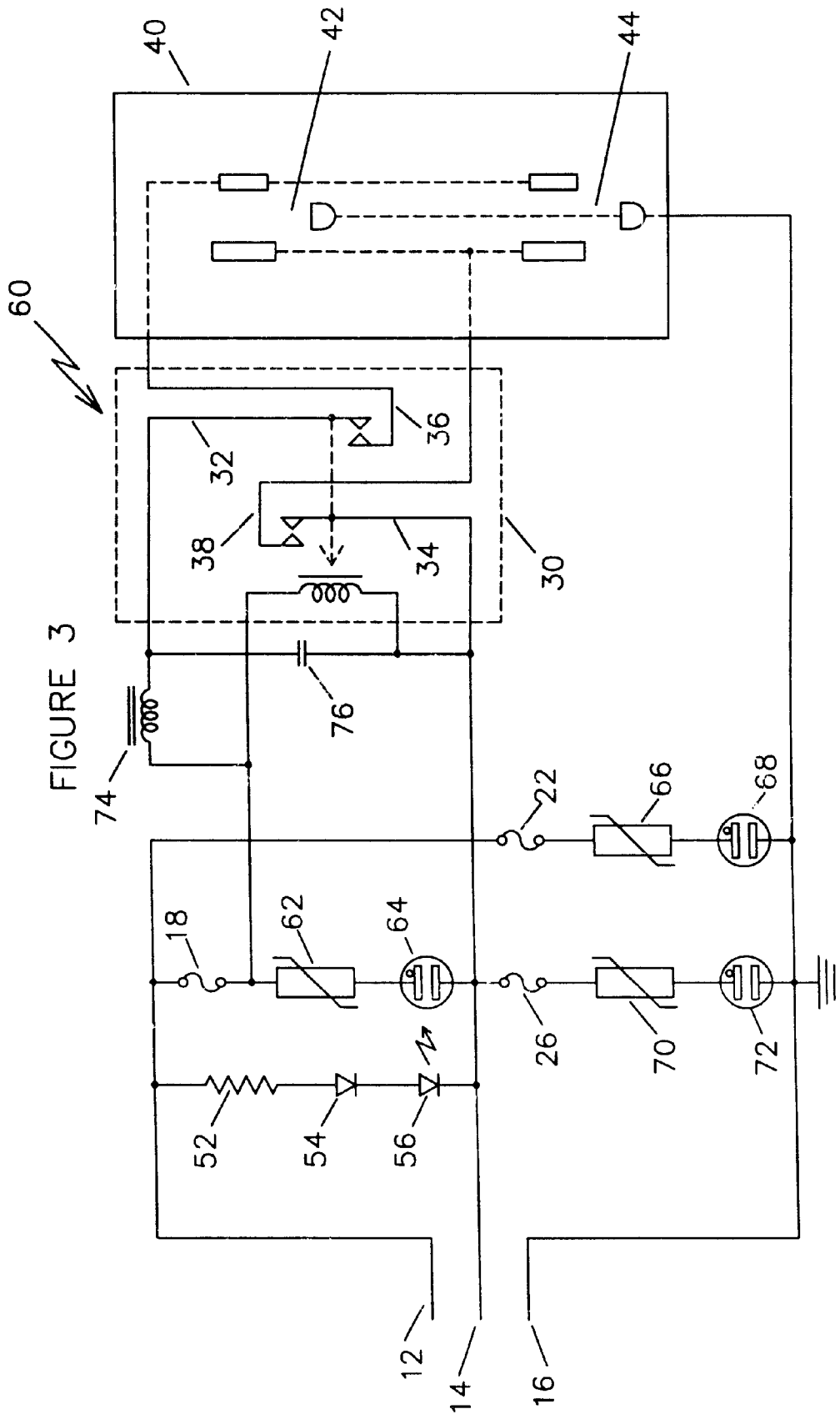
FIG. 3 is a schematic diagram of a third embodiment of the invention.

FIG. 3 is a schematic diagram of a third embodiment of the invention. The embodiment of FIG. 3 differs from the embodiments of FIGS. 1 and 2 in the nature of the AC overvoltage protection and in that some filtering is provided. In surge suppressor 60 the overvoltage protection between the AC line and the AC neutral, between the AC line and ground and between the AC neutral and ground comprises, in each instance, the series combination of a thermal sensing fuse, an MOV and a gas discharge tube (GDT). MOVs 62, 66 and 70 may have a breakdown voltage of 95 volts. GDTs 64, 68 and 72 may have a breakdown voltage of 425 volts. Filtering is provided by inductor 74 and capacitor 76. Inductor 74 may be 3.4 microhenries and capacitor 76 may be 0.22 microfarads. The series connection of the MOV and GDT eliminates leakage current through the MOV and prolongs the life of the MOV.

Figure 4:
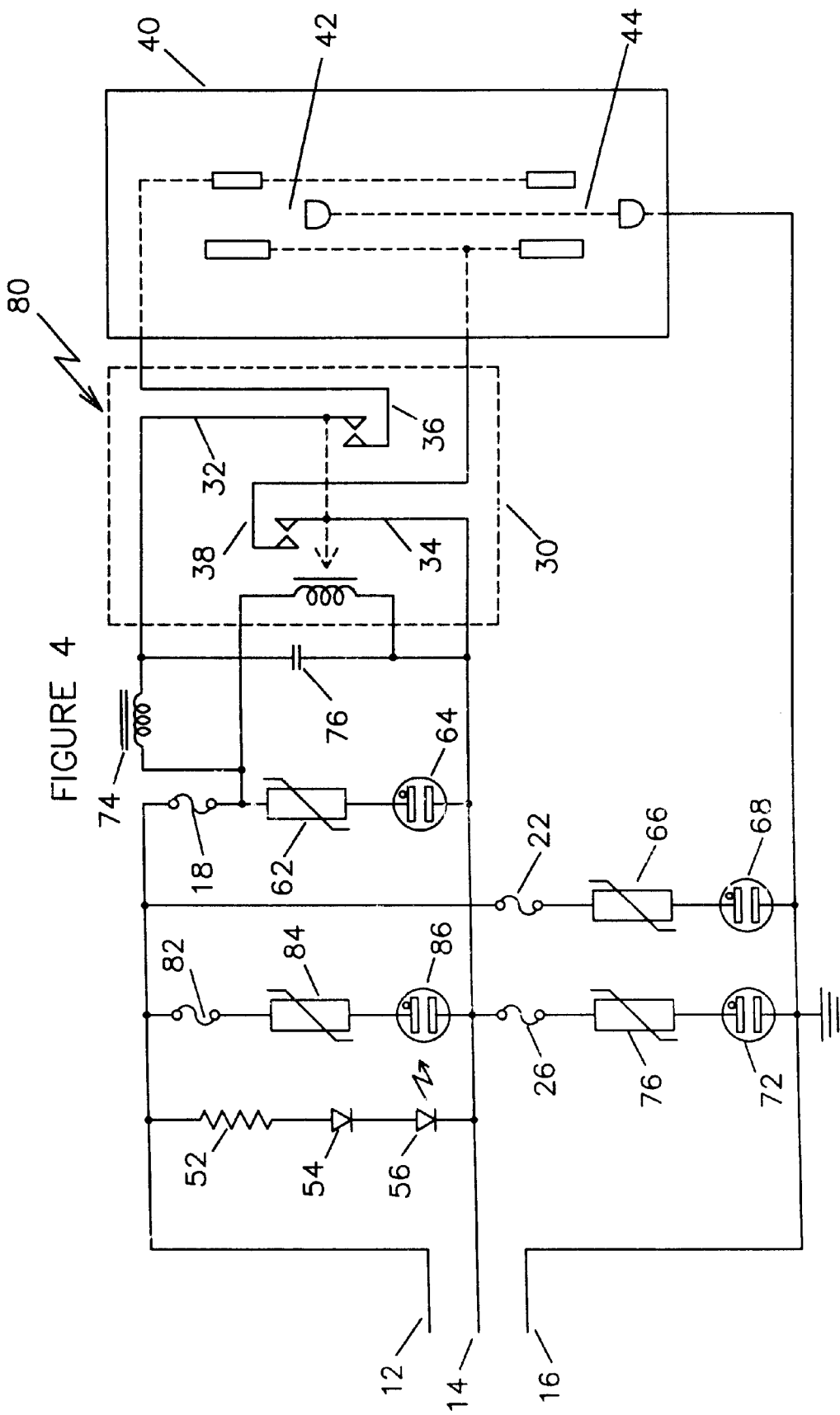
FIG. 4 is a schematic diagram of a fourth embodiment of the invention.

FIG. 4 is a schematic diagram of a fourth embodiment of the invention. The embodiment of FIG. 4 is similar to the embodiment of FIG. 3 except that the embodiment of FIG. 4 has additional overvoltage protection between the AC line and the AC neutral comprising thermal sensing fuse 82, MOV 84 and GDT 86. In the embodiment of FIG. 4, MOV 84 may have a breakdown voltage of 95 volts while MOV 62 may have a breakdown voltage of 120 volts.

Figure 5:
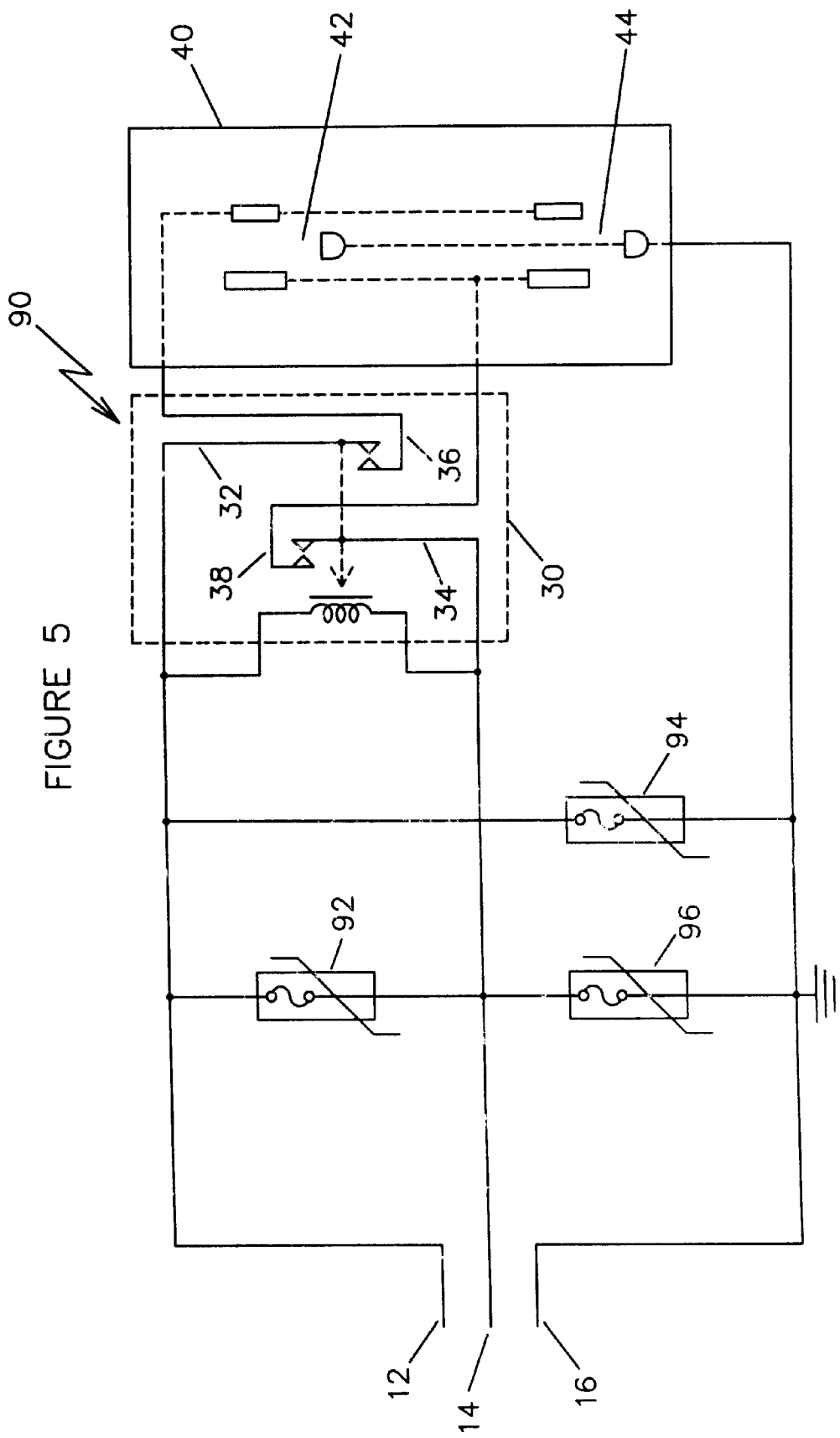
FIG. 5 is a schematic diagram of a fifth embodiment of the invention.

FIG. 5 is a schematic diagram of a fifth embodiment of the present invention. Relay 30 and GFCI 40 are the same as in the other embodiments. The AC overvoltage protection is different in that it employs MOVs 92, 94 and 96 with integral fusing elements. MOVs 92, 94 and 96 may be obtained from Maida Development Company, 20 Libby Street, Hampton, Va. as part number D6521ZOV131 RA20. MOVs 92, 94 and 96 may have a breakdown voltage of 130 volts.

While the present invention has been described by reference to various preferred embodiments, it will be understood by persons skilled in the art that many modifications and variations may be made in those preferred embodiments without departing from the spirit and scope of the present invention.

What is claimed is:

1. Combination ground fault circuit interrupter/surge suppressor apparatus adapted to be connected to AC line, AC neutral and ground comprising:
   (a) an AC overvoltage protection circuit connected between the AC line and the AC neutral;
   (b) a switchable device having an input and an output, the input being connected to the AC line and the AC neutral, the device allowing power to pass from the input to the output when the AC neutral is present but preventing power from passing from the input to the output when the AC neutral is absent; and
   (c) a ground fault circuit interrupter connected to the output of the switchable device and to ground.

2. The apparatus of claim 1 wherein the switchable device comprises a relay having a coil connected between the AC line and AC neutral and at least two sets of switchable contacts, one set being connected to the AC line and one set being connected to the AC neutral.

3. The apparatus of claim 2 wherein the AC overvoltage protection circuit comprises at least one MOV.

4. The apparatus of claim 3 wherein the AC overvoltage protection circuit further comprises a temperature sensing fuse in series with the MOV.

5. The apparatus of claim 3 wherein the AC overvoltage protection circuit comprises a gas discharge tube in series with the MOV.

6. The apparatus of claim 3 wherein the AC overvoltage protection circuit comprises a temperature sensing fuse and a gas discharge tube in series with the MOV.

7. Combination ground fault circuit interrupter/surge suppressor apparatus adapted to be connected to AC line, AC neutral and ground comprising:
   (a) a first AC overvoltage protection circuit connected between the AC line and the AC neutral;
   (b) a second AC overvoltage protection circuit connected between the AC line and ground;
   (c) a third AC overvoltage protection circuit connected between the AC neutral and ground;
   (d) a switchable device having an input and an output, the input being connected to the AC line and the AC neutral, the device allowing power to pass from the input to the output when the AC neutral is present but preventing power from passing from the input to the output when the AC neutral is absent; and
   (e) a ground fault circuit interrupter connected to the output of the switchable device and to ground.

8. The apparatus of claim 7 wherein the switchable device comprises a relay having a coil connected between the AC line and AC neutral and at least two sets of switchable contacts, one set being connected to the AC line and one set being connected to the AC neutral.

9. The apparatus of claim 8 wherein each AC overvoltage protection circuit comprises at least one MOV.

10. The apparatus of claim 9 wherein each AC overvoltage protection circuit further comprises a temperature sensing fuse in series with the MOV.

11. The apparatus of claim 9 wherein each AC overvoltage protection circuit comprises a gas discharge tube in series with the MOV.

12. The apparatus of claim 9 wherein each AC overvoltage protection circuit comprises a temperature sensing fuse and a gas discharge tube in series with the MOV.

* * * * *